(12) United States Patent
Fukaya

(10) Patent No.: US 6,275,303 B1
(45) Date of Patent: Aug. 14, 2001

(54) METHOD AND SYSTEM FOR PROCESSING MULTI-LEVEL TONE VALUE IMAGES INCLUDING TEXT, GRAPHIC IMAGES AND CONTINUOUS TONE IMAGES BY USING HALFTONING TECHNIQUE

(75) Inventor: Kousuke Fukaya, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 09/161,459

(22) Filed: Sep. 28, 1998

(30) Foreign Application Priority Data

Sep. 30, 1997 (JP) .................................................. 9-267563

(51) Int. Cl.[7] .................................................... H04N 1/41
(52) U.S. Cl. ............................................. 358/1.9; 382/237
(58) Field of Search ............................ 358/1.9, 455–460; 382/237, 251–253

(56) References Cited

U.S. PATENT DOCUMENTS 5,438,648 * 8/1995 Takaoka et al. ...................... 395/106

FOREIGN PATENT DOCUMENTS

0691784 A2 * 1/1996 (EP) ............................... H04N/1/41

* cited by examiner

Primary Examiner—Thomas D. Lee
Assistant Examiner—Stephen Brinich
(74) Attorney, Agent, or Firm—Oliff & Berridge, PLC

(57) ABSTRACT

An image processing method of binarizing a plurality of multi-level tone value images including at least a first multi-level tone value image and a second multi-level tone value image, the image processing method having the processes of: converting the first multi-level tone value image into a first bitmap image consisting of binary values; replacing each binary value of the first bitmap image representing an on condition by a maximum value in a tone value range of the second multi-level tone value image and replacing each binary value of the first bitmap image representing an off condition by a minimum value in the tone value range of the second multi-level tone value image; managing the first bitmap image, whose each binary value has been replaced by the maximum value or the minimum value in the tone value range of the second multi-level tone value image, and the second multi-level tone value image as a single intermediate image; converting the intermediate image into a second bitmap image consisting of binary values, by using a threshold data matrix; and outputting the second bitmap image.

20 Claims, 8 Drawing Sheets

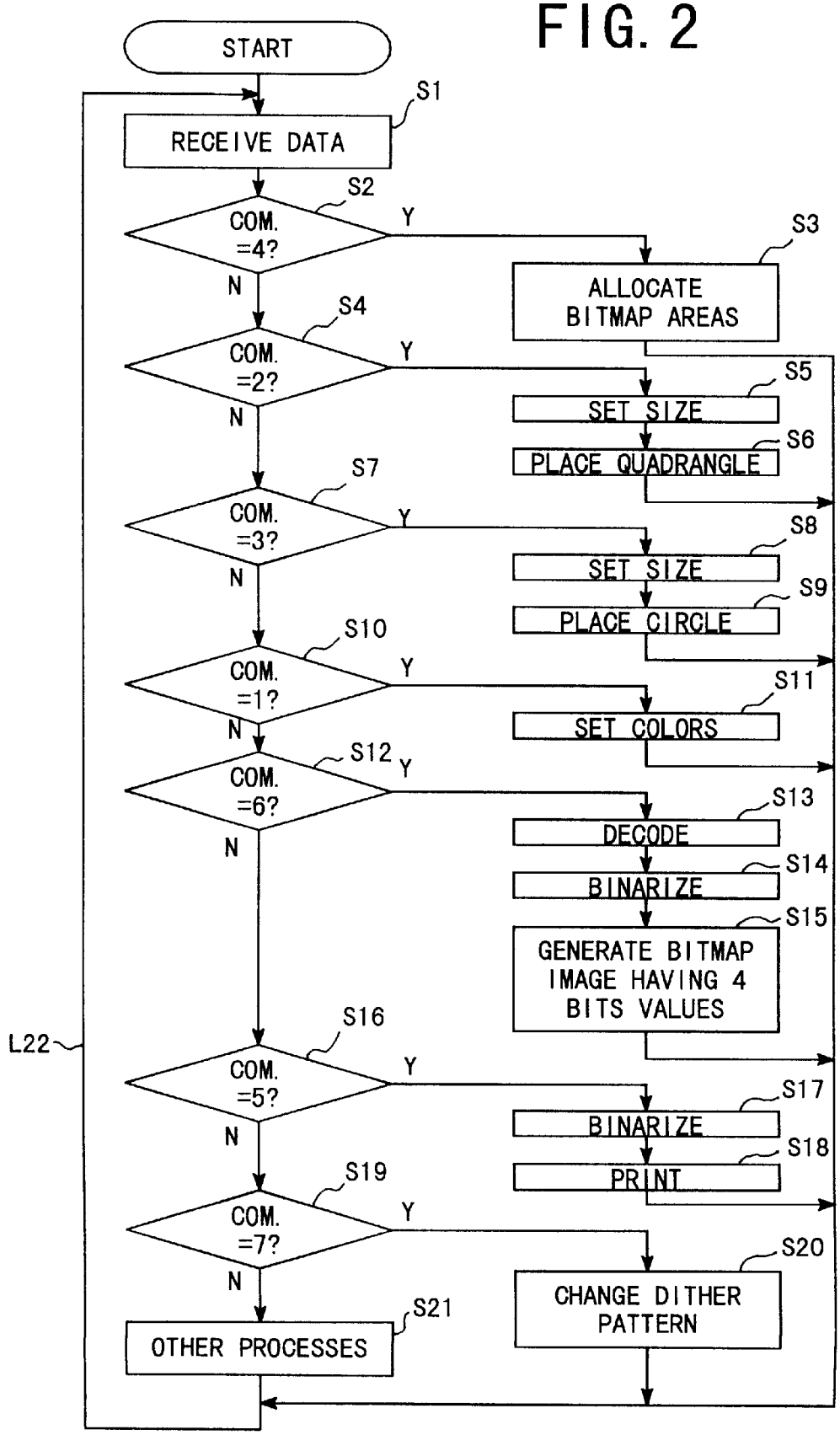

FIG. 3A

BASIC FORM | COMMAND NUMBER | VALUE |

FIG. 3B

COLORS | 1 | C | M | Y | K |

FIG. 3C

QUADRANGLE | 2 | Qx | Qy | Qw | Qh |

FIG. 3D

CIRCLE | 3 | Cx | Cy | Cr |

FIG. 3E

PAPER SIZE | 4 | Pw | Ph |

FIG. 3F

EXECUTE | 5 |

FIG. 3G

IMAGE LOCATION | 6 | Ix1 | Iy1 | Ix2 | Iy2 |

FIG. 3H

DITHER PATTERN | 7 | DP |

FIG. 5A

|   |   |   |   |
|---|---|---|---|
| 6 | 7 | 8 | 9 |
| 5 | 0 | 1 | 10 |
| 4 | 3 | 2 | 11 |
| 15| 14| 13| 12 |

|    | x1 | x2 | x3 | x4 | x5 | x6 | x7 | x8 |
|----|----|----|----|----|----|----|----|----|
| y1 | 8  | 8  | 8  | 8  | 8  | 8  | 8  | 8  |
| y2 | 8  | 8  | 8  | 8  | 8  | 8  | 8  | 8  |
| y3 | 8  | 8  | 8  | 8  | 8  | 8  | 8  | 8  |
| y4 | 8  | 8  | 8  | 8  | 8  | 8  | 8  | 8  |
| y5 | 8  | 8  | 8  | 8  | 8  | 8  | 8  | 8  |
| y6 | 8  | 8  | 8  | 8  | 8  | 8  | 8  | 8  |
| y7 | 8  | 8  | 8  | 8  | 8  | 8  | 8  | 8  |
| y8 | 8  | 8  | 8  | 8  | 8  | 8  | 8  | 8  |

|    | x1 | x2 | x3 | x4 | x5 | x6 | x7 | x8 |
|----|----|----|----|----|----|----|----|----|
| y1 | 1  | 1  | 1  | 0  | 1  | 1  | 1  | 0  |
| y2 | 1  | 1  | 1  | 0  | 1  | 1  | 1  | 0  |
| y3 | 1  | 1  | 1  | 0  | 1  | 1  | 1  | 0  |
| y4 | 0  | 0  | 0  | 0  | 0  | 0  | 0  | 0  |
| y5 | 1  | 1  | 1  | 0  | 1  | 1  | 1  | 0  |
| y6 | 1  | 1  | 1  | 0  | 1  | 1  | 1  | 0  |
| y7 | 1  | 1  | 1  | 0  | 1  | 1  | 1  | 0  |
| y8 | 0  | 0  | 0  | 0  | 0  | 0  | 0  | 0  |

| 0 | 7 | 0 | 7 |
|---|---|---|---|
| 0 | 0 | 0 | 0 |
| 0 | 7 | 0 | 7 |
| 0 | 0 | 0 | 0 |

|    | x1 | x2 | x3 | x4 | x5 | x6 | x7 | x8 |
|----|----|----|----|----|----|----|----|----|
| y1 | 2  | 8  | 4  | 6  | 2  | 8  | 4  | 6  |
| y2 | 10 | 15 | 7  | 4  | 10 | 15 | 7  | 4  |
| y3 | 2  | 8  | 4  | 6  | 2  | 8  | 4  | 6  |
| y4 | 10 | 15 | 7  | 4  | 10 | 15 | 7  | 4  |
| y5 | 2  | 8  | 4  | 6  | 2  | 8  | 4  | 6  |
| y6 | 10 | 15 | 7  | 4  | 10 | 15 | 7  | 4  |
| y7 | 2  | 8  | 4  | 6  | 2  | 8  | 4  | 6  |
| y8 | 10 | 15 | 7  | 4  | 10 | 15 | 7  | 4  |

|    | x1 | x2 | x3 | x4 | x5 | x6 | x7 | x8 |
|----|----|----|----|----|----|----|----|----|
| y1 | 0  | 9  | 0  | 5  | 0  | 9  | 0  | 5  |
| y2 | 0  | 0  | 0  | 0  | 0  | 0  | 0  | 0  |
| y3 | 0  | 9  | 0  | 5  | 0  | 9  | 0  | 5  |
| y4 | 0  | 0  | 0  | 0  | 0  | 0  | 0  | 0  |
| y5 | 0  | 9  | 0  | 5  | 0  | 9  | 0  | 5  |
| y6 | 0  | 0  | 0  | 0  | 0  | 0  | 0  | 0  |
| y7 | 0  | 9  | 0  | 5  | 0  | 9  | 0  | 5  |
| y8 | 0  | 0  | 0  | 0  | 0  | 0  | 0  | 0  |

|    | x1 | x2 | x3 | x4 | x5 | x6 | x7 | x8 |
|----|----|----|----|----|----|----|----|----|
| y1 | 0  | 1  | 0  | 0  | 0  | 1  | 0  | 0  |
| y2 | 0  | 0  | 0  | 0  | 0  | 0  | 0  | 0  |
| y3 | 0  | 1  | 0  | 0  | 0  | 1  | 0  | 0  |
| y4 | 0  | 0  | 0  | 0  | 0  | 0  | 0  | 0  |
| y5 | 0  | 1  | 0  | 0  | 0  | 1  | 0  | 0  |
| y6 | 0  | 0  | 0  | 0  | 0  | 0  | 0  | 0  |
| y7 | 0  | 1  | 0  | 0  | 0  | 1  | 0  | 0  |
| y8 | 0  | 0  | 0  | 0  | 0  | 0  | 0  | 0  |

|    | x1 | x2 | x3 | x4 | x5 | x6 | x7 | x8 |
|----|----|----|----|----|----|----|----|----|
| y1 | 0  | 15 | 0  | 0  | 0  | 15 | 0  | 0  |
| y2 | 0  | 0  | 0  | 0  | 0  | 0  | 0  | 0  |
| y3 | 0  | 15 | 0  | 0  | 0  | 15 | 0  | 0  |
| y4 | 0  | 0  | 0  | 0  | 0  | 0  | 0  | 0  |
| y5 | 0  | 15 | 0  | 0  | 0  | 15 | 0  | 0  |
| y6 | 0  | 0  | 0  | 0  | 0  | 0  | 0  | 0  |
| y7 | 0  | 15 | 0  | 0  | 0  | 15 | 0  | 0  |
| y8 | 0  | 0  | 0  | 0  | 0  | 0  | 0  | 0  |

215

METHOD AND SYSTEM FOR PROCESSING MULTI-LEVEL TONE VALUE IMAGES INCLUDING TEXT, GRAPHIC IMAGES AND CONTINUOUS TONE IMAGES BY USING HALFTONING TECHNIQUE

BACKGROUND OF THE INVENTION

1. Field of the Invention

The present invention relates to an image processing method and an image processing system wherein a combination of images including various types of color or halftone images, such as graphic images, continuous tone images, text and so on, is converted into a binary bitmap image by using halftoning techniques.

2. Description of the Related Art

When a combination of images including text, graphic images and continuous tone images is printed by a printer, the combination of images is converted into a binary bitmap image. If the combination of images includes halftone images or color images, halftoning techniques are used for the conversions of them.

Text and graphic images are generated by personal computers or word processors. The text and the graphic images are written in page description language. When the text and the graphic images are printed by the printer, they are converted into multi-level tone value images, each pixel of which has a multi-level tone value, such as a value that ranges between 0 and 255 (i.e., 8 bits value). Further, the multi-level tone value images are converted into the binary bitmap images by using a simple halftoning technique, such as an ordered dither method, a dot pattern method, or the like.

On the other hand, continuous tone images, such as photographs, are scanned by an image scanner and stored into a memory device of a personal computer. When the continuous tone images are printed by the printer, they are converted into binary bitmap images by using a halftoning technique that is different from the halftoning technique used for the conversion of text and graphic images. In case of continuous tone images, an error diffusion method or a minimum average error method is used for the purpose of increasing the quality of reproduction of continuous tone images.

Therefore, when a combination of images including color or halftone graphic images, continuous tone images and text is printed by the printer, it is converted into a binary bitmap image by using at least two kinds of halftone technique, depending on whether each image is graphic image, continuous tone image or text.

A dither pattern is used in the dithering process. The properties of the dither pattern affect tone and resolution of a binary bitmap image generated in the dithering process. If the user can selects a suitable dither pattern from among various dither patterns, it is possible to increase the quality of the binary bitmap image.

However, if the dither pattern is changed, the text and the graphic images have to be converted again into the multi-level tone value images, and the multi-level tone value images have to be further converted again into the binary bitmap images. And also, the continuous tone images have to be converted again into the binary bitmap images. Thus, each time the dither pattern is changed, the converting process wherein text and graphic images are converted into multi-level tone value images, the converting process wherein the multi-level tone value images are converted into binary bitmap images, and the converting process wherein continuous tone images are converted into binary bitmap images have to be performed again, regardless of that the original text, graphic images and continuous tone images are not changed. As a result, each time the dither pattern is changed, it takes a long time for the converting processes.

SUMMARY OF THE INVENTION

It is therefore an object of the present invention to provide an image processing method and an image processing system which can quickly convert a combination of text, graphic images and continuous tone images into a binary bitmap image when a dither pattern is changed.

According to the present invention, the above mentioned object can be achieved by an image processing method of binarizing a plurality of multi-level tone value images including at least a first multilevel tone value image and a second multi-level tone value image, the image processing method having the processes of: converting the first multi-level tone value image into a first bitmap image consisting of binary values; replacing each binary value of the first bitmap image representing an on condition by a maximum value in a tone value range of the second multi-level tone value image and replacing each binary value of the first bitmap image representing an off condition by a minimum value in the tone value range of the second multi-level tone value image; managing the first bitmap image, whose each binary value has been replaced in the replacing process, and the second multi-level tone value image as a single intermediate image; converting the intermediate image into a second bitmap image consisting of binary values, by using a threshold data matrix; and outputting the second bitmap image.

The first multi-level tone value image is converted into the first bitmap image. The first bitmap image consists of a plurality of binary values (i.e., dots) each representing either an on condition or an off condition.

Next, the first bitmap image is further converted in the following manner. Namely, each binary value of the first bitmap image representing the on condition is replaced by the maximum value in the tone value range of the second multi-level tone value image, and each binary value of the first bitmap image representing the off condition is replaced by the minimum value in the tone value range of the second multi-level tone value image. Thus, the value range of each value of the first bitmap image is the same as that of the second multi-level tone value image.

After this process, the first bitmap image and the second multi-level tone value image are managed as a single intermediate image.

Next, the intermediate image is converted into a second bitmap image consisting of binary values, by using the threshold data matrix. Next, the second bitmap image is outputted.

As every value of the intermediate image (i.e., the first bitmap image and the second multi-level tone value image) is in the same value range, the intermediate image can be converted into the second bitmap image by only one kind of converting process. Therefore, the intermediate image can be converted in a short time.

When the intermediate image is converted into the second bitmap image, the threshold data matrix may be changed to a different threshold data matrix for the purpose of, for example, changing tone and resolution of the second bitmap image. If the threshold data matrix is changed, the new second bitmap image can be quickly generated because it can be generated by using the intermediate image which has been previously generated. Namely, the new second bitmap image can be generated by only converting the intermediate image by using the different threshold data matrix. It is not required to generate intermediate image again. Therefore, it is possible to quickly generate the second bitmap image by using various threshold matrix.

According to the present invention, the above mentioned object can be also achieved by an image processing system for binarizing a plurality of multi-level tone value images including at least a first multi-level tone value image and a second multi-level tone value image, the image processing system having: a first converting device for converting the first multi-level tone value image into a first bitmap image consisting of binary values; a replacing device for replacing each binary value of the first bitmap image representing an on condition by a maximum value in a tone value range of the second multi-level tone value image and replacing each binary value of the first bitmap image representing an off condition by a minimum value in the tone value range of the second multi-level tone value image; a storage device for storing the first bitmap image, whose each binary value has been replaced by the maximum value or the minimum value in the tone value range of the second multi-level tone value image, and the second multi-level tone value image as a single intermediate image; a second converting device for converting the intermediate image into a second bitmap image consisting of binary values by using a threshold data matrix; and an outputting device for outputting the second bitmap image.

The nature, utility, and further feature of this invention will be more clearly apparent from the following detailed description with respect to preferred embodiments of the invention when read in conjunction with the accompanying drawings briefly described below.

BRIEF DESCRIPTION OF THE DRAWINGS

FIG. 2 is a flowchart showing converting processes and printing processes of the computer system of the embodiment of the present invention;

FIGS. 3A through 3H are diagrams showing page description language;

FIG. 5A is a diagram showing a dither pattern according to the embodiment of the present invention;

FIG. 5B is a diagram showing a 4 bits tone value image corresponding to a graphic image according to the embodiment of the present invention;

FIG. 5C is a diagram showing a binary bitmap image corresponding to the graphic image according to the embodiment of the present invention;

FIG. 6A is a diagram showing a threshold matrix according to the embodiment of the present invention;

FIG. 6B is a diagram showing a 4 bits tone value image corresponding to a continuous tone image according to the embodiment of the present invention;

FIG. 6C is a diagram showing a converting matrix according to the embodiment of the present invention;

FIG. 6D is a diagram showing a binary bitmap image corresponding to the continuous tone image according to the embodiment of the present invention;

FIG. 6E is a diagram showing a converted bitmap image according to the embodiment of the present invention.

DETAILED DESCRIPTION OF THE PREFERRED EMBODIMENTS

Referring to the accompanying drawings, an embodiment of the present invention will be now described. In the description set forth hereinafter, an image processing system of the present invention is embodied in a computer system having a computer and a printer.

Figure 1:
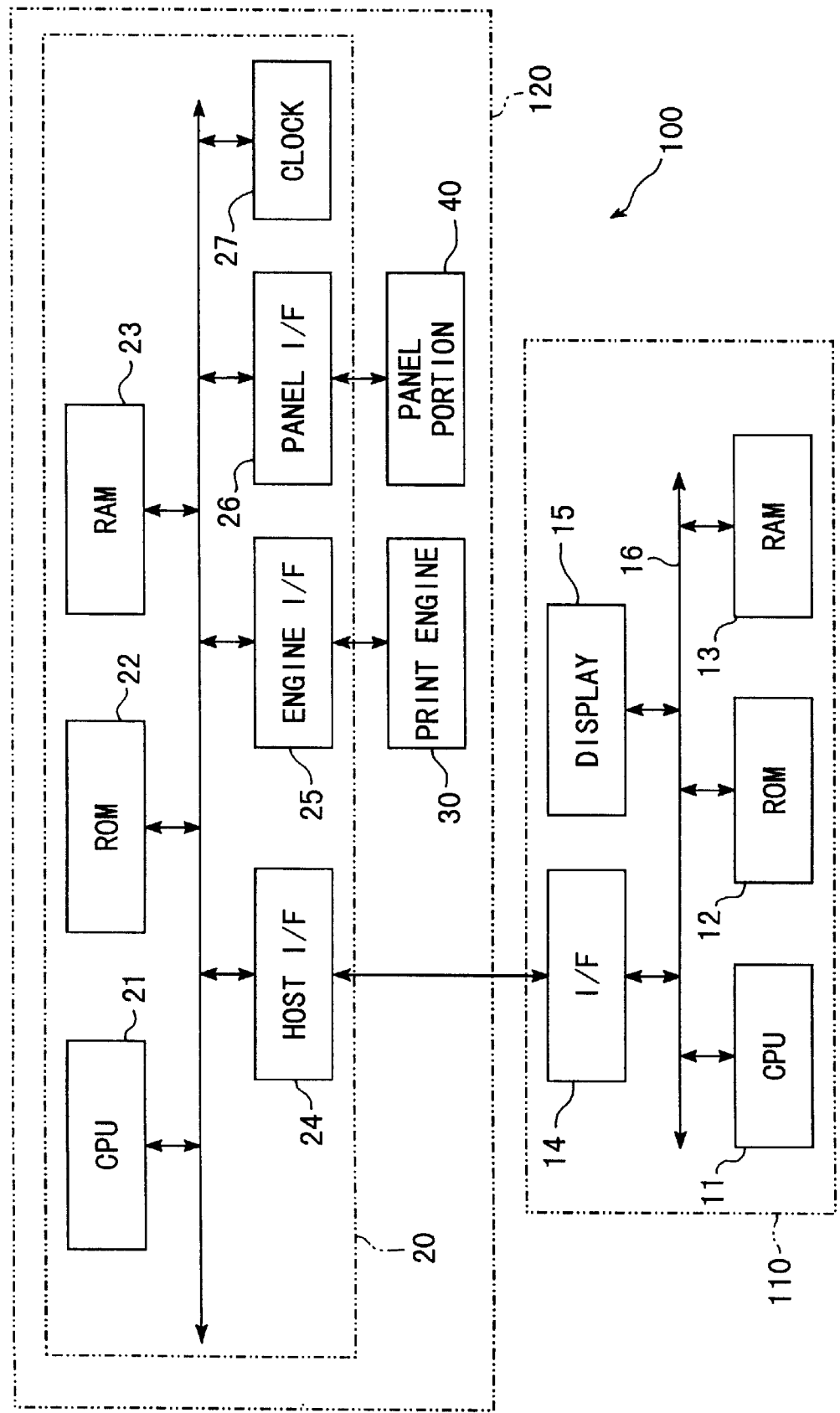
FIG. 1 is a block diagram showing a computer system of an embodiment of the present invention.

FIG. 1 shows a construction of the computer system 100. As shown in FIG. 1, the computer system 100 has a computer 110 and a printer 120. The printer 120 is coupled with the computer 110.

The computer 110 is, for example, a personal computer having a function which allows the user to write documents and draw graphic images. In addition, the computer 110 may be a word processor.

The computer 110 has a CPU 11, a ROM 12, a RAM 13, an interface circuit 14 and a display device 15. The CPU 11 controls the computer 110 and performs various data processes. The ROM 12 stores a "text and graphic images processing program" and other data processing programs. The RAM 13 is used as a storage for storing text and graphic images written and drawn by the text and graphic images processing program. The interface circuit 14 is an interface to connect the computer 110 with the printer 120. The display device 15 is, for example, a cathedra lay tube (CRT) display to display text, graphic images and other messages and information. The CPU 11, the ROM 12, the RAM 13, the interface circuit 14 and the display device 15 are interconnected through the bus 16. Further, user-interfaces, such as a keyboard, a mouse, an image scanner, a disc driver device and other input devices, are connected with the computer 110 (which are not depicted).

The text and graphic images processing program stored in the ROM 12 is, for example, a word processing application program. The computer 110 can generate text including characters and symbols, and graphic images including line drawings by executing this program.

Further, the computer 110 can generate the text and the graphic images for each page, and place them at specific positions on a page. Furthermore, the computer 110 can accepts continuous tone images, such as photographs, from the image scanner, and place them at specific positions on the page, together with the text and the graphic images. Thus, the computer 110 can generate a combination of images including text, graphic images and continuous tone images. Further, the computer 110 can generate not only monochromatic images but also color images, namely, colored text, colored graphic images and colored continuous tone images.

The printer 120 operates to print text, graphic images and continuous tone images onto a printing medium such as printing paper. The printer 120 can print color images.

The printer 120 has a control portion 20, a print engine 30 and a panel portion 40. The control portion 20 controls the printer 120, and performs converting processes, printing processes and other data processes. The converting processes include a rasterizing process. The print engine 30 actually prints images onto a printing medium under the control of the control portion 20. The panel portion 40 displays messages and information concerning the operations of the printer 120 and allows the user to manually input commands or instructions.

The control portion 20 has a CPU 21, a ROM 22, a RAM 23, a host interface circuit 24, an engine interface circuit 25, a panel interface circuit 26 and a clock oscillator 27. The CPU 21 controls the control portion 20 and performs the converting processes, the printing processes and other data processes. The ROM 22 stores "converting processes and printing processes control program" (FIG. 2) and other data processing programs. The RAM 23 is used as a storage for storing image data and other necessary data. The host interface circuit 24 serves as an interface to connect between the printer 120 and the computer 110. The engine interface circuit 25 serves as an interface to connect between the control portion 20 and the print engine 30. The panel interface circuit 26 serves as an interface to connect between the control portion 20 and the panel portion 40. The clock oscillator 27 supplies a clock pulse to the CPU 21, the ROM 22, the RAM 23 and the interface circuits 24, 25 and 26.

As described above, the computer 110 can generate a combination of color images including text, graphic images and continuous tone images. Actually, the computer 110 writes it in page description language.

FIG. 3A shows a basic form of the page description language. As shown in FIG. 3A, the page description language basically forms a command number and one or more values. The page description language has a great number of commands to form images. The command number is a number to identify a specific command. The values following the command number are used in a process corresponding to a specific command identified by the command number.

FIGS. 3B through 3H show examples of the page description language. In FIG. 3B, the command number "1" represents a command to set colors. The values following this command number represent 8 bits tone values of cyan (C), magenta (M), yellow (Y) and black (K), respectively. Each value ranges between 0 and 255.

Figure 4:
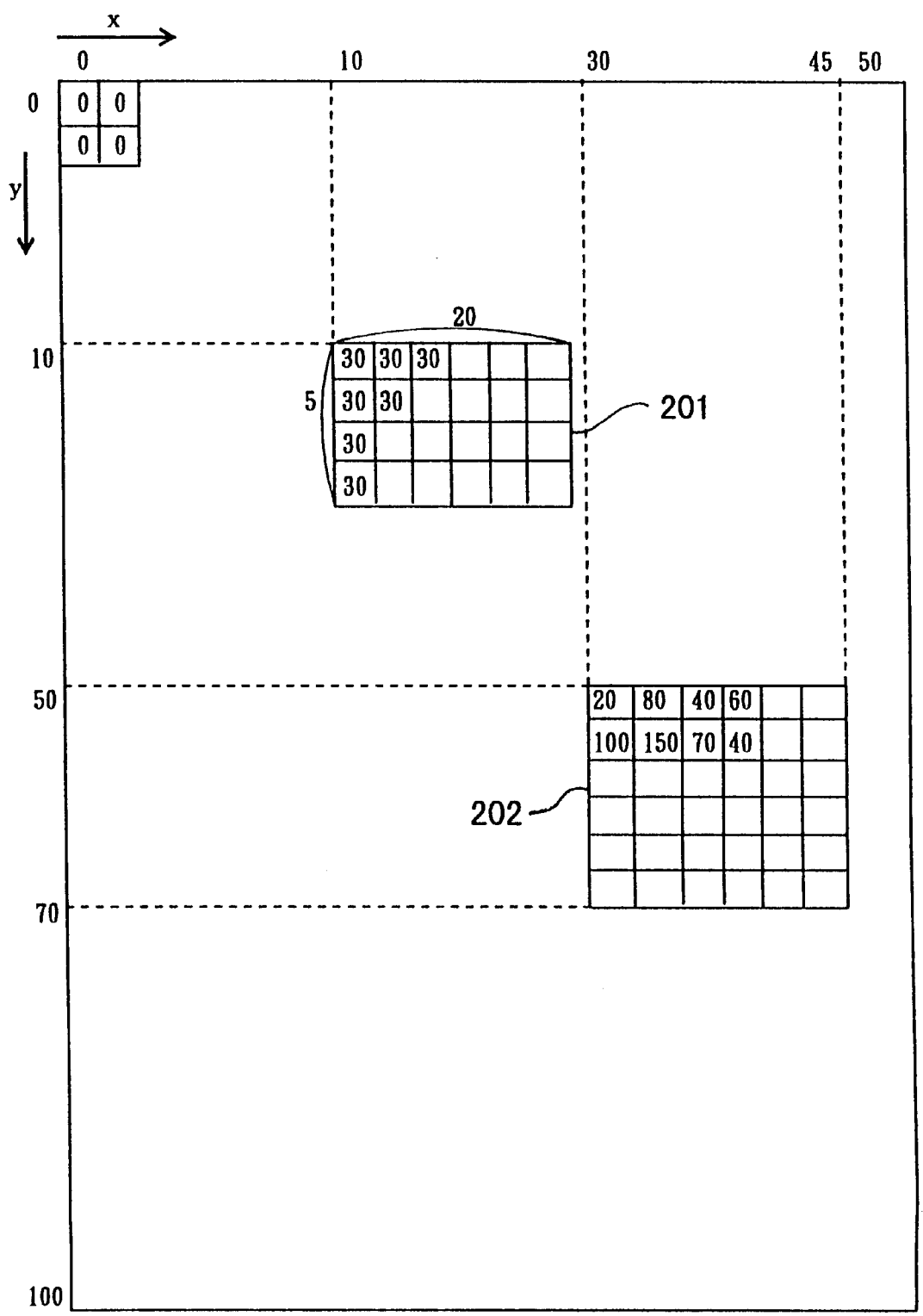
FIG. 4 is a diagram showing a bitmap area according to the embodiment of the present invention.

In FIG. 3C, the command number "2" represents a command to form a quadrangle. The values "Qx" and "Qy" following this command number represent the location of the quadrangle, namely, the X and Y coordinate values on a bitmap area. The next value "Qw" represents the width of the quadrangle, namely, the length of the quadrangle in the X direction of the bitmap area. The next value "Qh" represents the height of the quadrangle, namely, the length of the quadrangle in the Y direction of the bitmap area. The bitmap area is a two dimensional address space allocated to the memory space of the RAM 23. FIG. 4 shows the bitmap area. As shown in FIG. 4, a quadrangle 201 is placed on the bitmap area. The quadrangle 201 is located at the position based on a point (10, 10) on the bitmap area, and it has the width of 20 dots and the height of 5 dots.

In FIG. 3D, the command number "3" represents a command to form a circle. The values "Cx" and "Cy" following this command number represent the location of the circle, namely, the X and Y coordinate values on the bitmap area. The next value "Cr" represents a radius of the circle.

In FIG. 3E, the command number "4" represents a command to set paper size (i.e. page size). The values "Pw" and "Ph" following this command number represent the width of the paper and the height of the paper, respectively. The paper size corresponds to the bitmap area. Therefore, the width of the paper corresponds the length of the bitmap area in the X direction, and the height of the paper corresponds the length of the bitmap area in the Y direction.

In FIG. 3F, the command number "5" represents a command to instruct execution of the printing processes. As described in detail later, when the CPU 21 of the printer 120 recognizes this command number, the CPU 21 converts an intermediate image stored in the RAM 23 into a binary bitmap image, and drives the print engine 30 so as to print the binary bitmap image onto a printing medium.

In FIG. 3G, the command number "6" represents a command to specify the location of a continuous tone image on the bitmap area. The values "lx1" and "ly1" following this command number represent the X and Y coordinate values of one vertex of a quadrangular area where the continuous tone image is placed. The next values "lx2" and "ly2" represent the X and Y coordinate values, respectively, of another vertex of the quadrangular area. The vertex (lx1, ly1) and the vertex (lx2, ly2) are opposite to each other on the diagonal line of the quadrangular area. As shown in FIG. 4, a continuous tone image 202 is placed on the bitmap area. One vertex of the quadrangular area where the continuous tone image is placed is located at the point (30, 50), and the other vertex is located at the point (45, 70).

In FIG. 3H, the command number "7" is a command to change a dither pattern. The value "DP" following this command number represents the number designating a certain dither pattern. As described in detail later, a dither pattern is used in the converting process wherein an intermediate image is converted into a binary bitmap image. A plurality of dither patterns are prepared in the printer 120, namely, for example, pre-stored in the ROM 22. The dither patterns are different from each other in threshold values, size of matrix, a shape of pattern, the number of screen line and the other properties. When the CPU 21 recognizes this command number, the CPU 21 changes the current dither pattern to a different dither pattern designated by the value "DP". Alternatively, one or more dither patterns may be sent from the computer 110 to the printer 120, together with page description language data.

In addition, there are a lot of commands other than the commands described above.

Referring to FIG. 2, the converting processes and the printing processes will be described in detail.

A combination of color images including text, graphic images and continuous tone images is generated by the computer 110. As described above, the combination of color images is written in page description language for each page, except for continuous tone images themselves. The page description language data is fed into the printer 120 from the computer 110, and stored into the RAM 23 of the printer 120 (step 1). Next, the CPU 21 of the printer 120 analyzes each command included in the page description language data.

When the CPU 21 recognizes the command number "4" (step 2), the CPU 21 reads the values "Pw" and "Ph" following this command number, and allocates the bitmap areas to the memory space of the RAM 23 (step 3). The bitmap areas are allocated for each color, namely, cyan, magenta, yellow and black. Each bitmap area has an area of "Pw" X "Ph".

When the CPU 21 recognizes the command number "2" (step 4), the CPU 21 reads the values "Qx", "Qy", "Qw" and "Qh" following this command number. Next, the CPU 21 forms a quadrangle having the area of "Qw" X "Qh" (step 5), and places it at the position based on the point (Qx, Qy) on each of the bitmap areas (step 6).

When the CPU 21 recognizes the command number "3" (step 7), the CPU 21 reads the values "Cx", "Cy" and "Cr" following this command number. Next, the CPU 21 forms a circle having the radius "Cr" (step 8), and places it at the position based on the point (Cx, Cy) on each of the bitmap areas (step 9).

When the CPU 21 recognizes the command number "1" (step 10), the CPU 21 reads the 8 bits tone values "C", "M", "Y" and "K" following this command number. Next, the CPU 21 writes the 8 bits tone values "C", "M", "Y" and "K" onto the inside of the quadrangle or the circle which have been placed on each of the bitmap areas (step 11). For example, the CPU 21 writes the 8 bits tone values onto the inside of the quadrangle or the circle which have been placed immediately before the CPU 21 recognizes this command number. As described above, the bitmap areas are allocated for each color, namely, cyan, magenta, yellow and black. Therefore, the CPU 21 writes the 8 bits tone values of cyan (C) onto the inside of the quadrangle or the circle placed on the bitmap area of cyan, and then writes the 8 bits tone values of magenta (M) onto the inside of the quadrangle or the circle placed on the bitmap area of magenta, and then writes the 8 bits tone values of yellow (Y) onto the inside of the quadrangle or the circle placed on the bitmap area of yellow, and next writes the 8 bits tone values of black (B) onto the inside of the quadrangle or the circle placed on the bitmap area of black.

For example, as shown in FIG. 4, the quadrangle 201 is placed on the bitmap area of cyan. The quadrangle 201 has the area of 20 dots×5 dots. If the 8 bits tone value of cyan with respect to the quadrangle is, for example, "30", the CPU 21 writes the value "30" onto all dots existing on the inside of the quadrangle 201. In addition, the CPU 21 writhes a value "0" onto each dot existing on the outside of the quadrangle 201. The CPU 21 performs the similar operation with respect to each of the other colors.

Next, the CPU 21 converts the 8 bits tone values into 4 bits tone values each of which ranges between 0 and 15. For example, the 8 bits tone value "30" is converted into "1" (i.e., 30×16/256÷1). The 8 bits tone value "128" is converted into "8".

Thus, the multi-level tone value images having 4 bits tone values are formed on each of the bitmap areas in steps 4 through 11. Hereinafter, a multi-level tone value image having 4 bits tone values is referred to as a "4 bits tone value image".

When the CPU 21 recognizes the command number "6" (step 12), the CPU 21 reads the values "lx1", "ly1", "lx2" and "ly2" following this command number. Next, the CPU 21 receives a continuous tone image from the computer 110, and places this continuous tone image on the bitmap areas. The location and the size of this continuous tone image are decided by the values "lx1", "ly1", "lx2" and "ly2".

When the continuous tone image is placed on the bitmap areas, the continuous tone image is decoded (step 13). In the decoding process, the tone values corresponding to the colors of the respective pixels of the continuous tone image are written on the bitmap areas. Each tone value ranges between 0 and 255 (i.e., 8 bits value). Therefore, in step 13, the 8 bits tone value image corresponding to the continuous tone image is formed on the bitmap areas. For example, as shown in FIG. 4, the 8 bits tone value image 202 corresponding to a continuous tone image is formed.

Next, the CPU 21 converts the 8 bits tone value image corresponding to the continuous tone image into a binary bitmap image by using the minimum average error method or the error diffusion method (step 14).

Referring to FIGS. 6A to 6D, an example of this converting process will be described. In this converting process, each tone value of the 8 bits tone value image corresponding to the continuous tone image is converted from 8 bits into 4 bits. Therefore, the 4 bits tone value image 212 corresponding to the continuous tone image is formed on the bitmap areas, as shown in FIG. 6B. Next, a converting matrix 213 is generated on the basis of the 4 bits tone value image 212, as shown in FIG. 6C. For example, in FIG. 6B, the average of the 4 bits tone values existing on the 2×2 square area: (x1, y1), (x2, y1), (x1, y2) and (x2, y2) of the 4 bits tone value image 212 are calculated. Next, the resultant average value is written on the dot (x2, y1) of the 4 bits tone value image 212, and a value "0" is written on the other dots (x1, y1), (x1, y2) and (x2, y2) of the 4 bits tone value image 212. Such a process is performed on the 4 bits tone value image 212 for each 2×2 square area. As a result, the converting matrix 213, as shown in FIG. 6C, is formed. Next, the converting matrix 213 is compared with the threshold matrix 211 for each 4×4 square area. The threshold matrix 211 has 4 bits values each of which ranges between 0 and 15, and it is pre-stored in the ROM 22 for example. If a value of the converting matrix 213 is not less than the corresponding value of the threshold matrix 211, a value "1" is written on the corresponding position of the converting matrix 213. If a value of the converting matrix 213 is less than the corresponding value of the threshold matrix 211, a value "0" is written on the corresponding position of the converting matrix 213. For example, in the threshold matrix 211, the value at the point (x2, y1) is "7". In the converting matrix 213, the value on the dot (x2, y1) is "9". Therefore, the value of the converting matrix 213 is not less than the corresponding value of the threshold matrix 211. As a result, a value "1" is written on the dot (x2, y1) of the converting matrix 213. On the other hand, in the threshold matrix 211, the value at the point (x4, y1) is "7". In the converting matrix 213, the value on the dot (x4, y1) is "5". Therefore, the value of the converting matrix 213 is less than the corresponding value of the threshold matrix 211. As a result, a value "0" is written on the dot (x4, y1) of the converting matrix 213. Thus, the binary bitmap image 214 corresponding to the continuous tone image is formed, as shown in FIG. 6D. This converting process is performed for each color, namely, cyan, magenta, yellow and black.

Next, the CPU 21 further converts the binary bitmap image corresponding to the continuous tone image into a bitmap image having the same value range of the 4 bits tone value image which is formed in step 4 through 11 (step 15).

Referring to FIGS. 6D and 6E, an example of this converting process will be described. In this converting process, a value "1" of the binary bitmap image 214 shown in FIG. 6D is replaced by a value "15", and a value "0" of the binary bitmap image 214 is not changed. The value "15" is the maximum value of a 4 bits tone value. The value "0" is the minimum value of the 4 bits tone value. Thus, the binary bitmap image 214 is converted into a bitmap image 215 having the same value range of the 4 bits tone value image, as shown in FIG. 6E. This converting process is performed for each color, namely, cyan, magenta, yellow and black.

It should be noted that the 4 bits tone value images are formed on the bitmap areas for each color in steps 4 though 11, and the bitmap images having the same value range as the 4 bits tone value images are formed on the same bitmap areas for each color in steps 12 through 15. The 4 bits tone value images and the bitmap images are managed as a single image on the bitmap areas for each color. This means that the 4 bits tone value images and the bitmap images are combined with each other. The image including the 4 bits tone value images and the bitmap images is referred to as an "intermediate image".

As shown in FIG. 2, at step 16, when the CPU 21 recognizes the command number "5", the CPU 21 converts the intermediate image into a binary bitmap image (step 17).

Referring to FIGS. 5A through 5C and 6E, an example of this converting process will be described. After steps 4, 5, 6, 10 and 11 in FIG. 2 are carried out, the 4 bits tone value image 222 corresponding to a quadrangle is formed on the bitmap areas. First, this 4 bits tone value image 222 is compared with the dither pattern 221 for each 4×4 square area. The dither pattern 221 has 4 bits values arranged in a 4×4 matrix, and each value ranges between 0 and 15. If a value of the 4 bits tone value image 222 is not less than the corresponding value of the dither pattern 221, a value "1" is written on the corresponding dot of the 4 bits tone value image 222. If a value of the 4 bits tone value image 222 is less than the corresponding value of the dither pattern 221, a value "0" is written on the corresponding dot. For example, in the dither pattern 221 shown in FIG. 5A, the values at the point (x1, y1), (x2, y1) and (x3, y1) are "6", "7", and "8", respectively. In the 4 bits tone value image 222 shown in FIG. 5B, all of the values on the dots (x1, y1), (x2, y1) and (x3, y1) are "8". Therefore, a value "1" is written on the dots (x1, y1), (x2, y1) and (x3, y1). On the other hand, in the dither pattern 221, the value at the point (x4, y1) is "9". In the 4 bits tone value image 222, the value on the dot (x4, y1) is "8". Therefore, a value "0" is written on the dot (x4, y1). Thus, the binary bitmap image 223 corresponding to the 4 bits tone value image 222 is formed.

Simultaneously, the CPU 21 converts the bitmap image 215 formed at steps 12 though 15 into the binary bitmap image by using the same dither pattern 221 (step 17). The dither pattern 221 is compared with the bitmap image 215 shown in FIG. 6E. It should be noted that, like the 4 bits tone value image 222, the bitmap image 215 has 4 bits values (i.e., either "0" or "15"). Therefore, this converting process can be performed in the same manner as the converting process wherein the 4 bits tone value image 222 into the binary bitmap image 223. Accordingly, the CPU 21 can simultaneously converts both the 4 bits tone value image 222 and the bitmap image 215 into the binary bitmap image at step 17.

Further, in this converting process, a value "15" of the bitmap image 215 is changed into a binary value "1", and a value "0" of the bitmap image 215 is not changed. Consequently, the binary bitmap image 214 shown in FIG. 6D is restored in this converting process. In addition, this converting process is performed for each color, namely,. cyan, magenta, yellow and black. Furthermore, in this converting process, the binary bitmap image is formed on the different areas from the bitmap areas. Therefore, the intermediate image remains on the bitmap areas, after this converting process.

Next, as shown in FIG. 2, the CPU 21 drives the print engine 30 (step 18). The binary bitmap image corresponding to the intermediate image is printed onto a printing medium by the print engine 30.

When the CPU 21 recognizes the command number "7", (step 19), the CPU 21 reads the value "DP" following this command number, and the CPU 21 changes the dither pattern according to the value "DP" (step 20). For example, the CPU 21 changes the dither pattern 221 into another dither pattern stored in the ROM 22.

When the CPU 21 recognizes a command number other than the command numbers 1 through 7 (step 21), the CPU 21 performs other processes according to the command number. Then, steps 1 through 21 are repeated until the combination of color images are completely printed out.

If the CPU 21 recognizes a command number "5" after the dither pattern is changed into a different dither pattern at step 20, the CPU 21 converts the intermediate image into a binary bitmap image by using the dither pattern that has been changed (step 17). By using the intermediate image, it is possible to obtain the binary bitmap image. By only carrying out the converting process of step 17 (i.e., conversion of the intermediate image into the binary bitmap image), the binary bitmap image can be obtained. It is not necessary to carry out the converting process wherein the page description language data of text and graphic images are converted into 8 bits tone value images and 4 bits tone value images (steps 5, 6, 8, 9 and 11), unless the text or graphic image itself is changed. It is also unnecessary to carry out the converting process wherein continuous tone images are converted into binary bitmap images by using the minimum average error method or the error diffusion method (steps 13 and 14), unless the continuous tone image itself is changed. As a result, if the dither pattern is changed, the total amount of time of the converting process is short. Accordingly, it is possible to print quickly a combination of color images including text, graphic images and continuous tone images by using various dither patterns.

Figure 7:
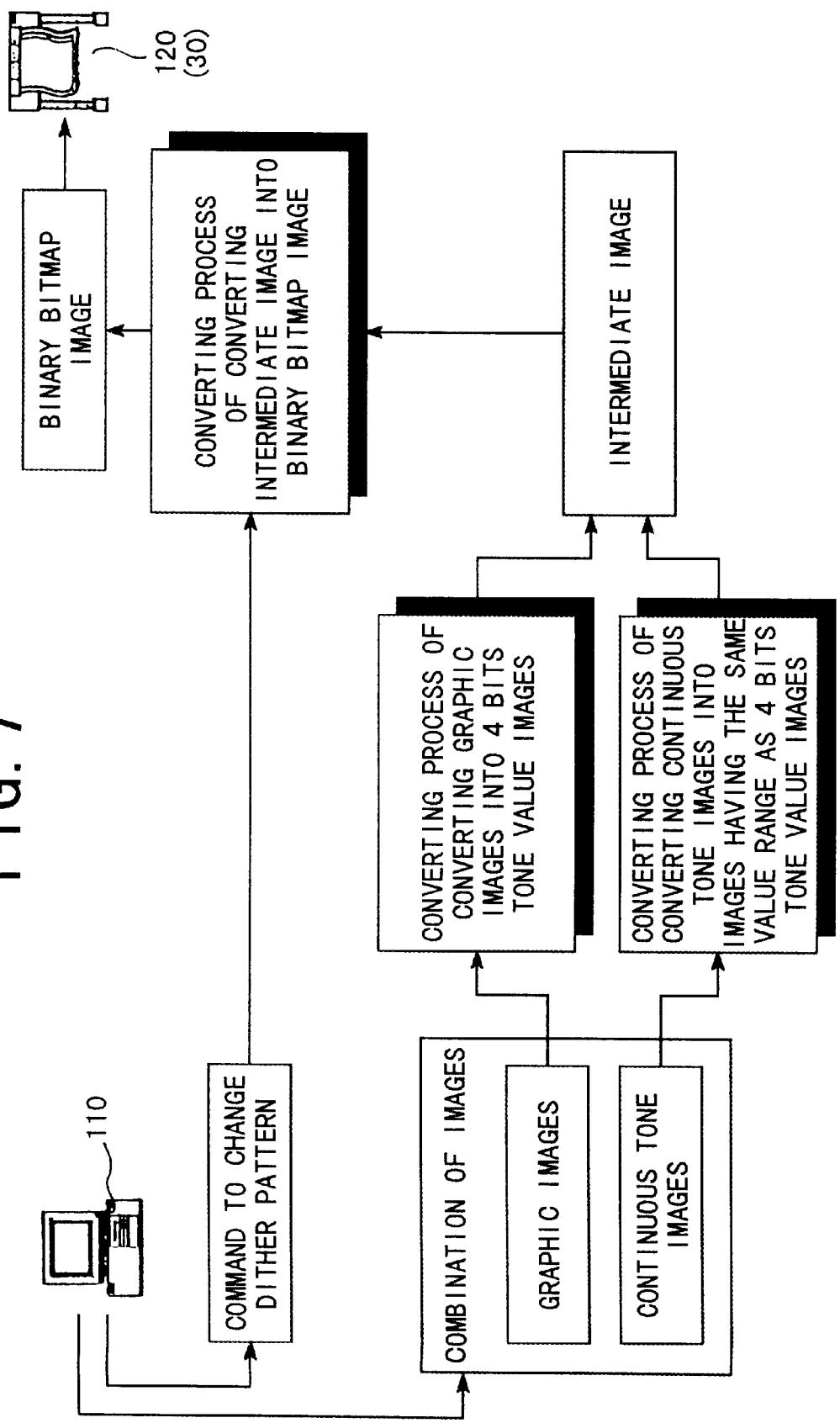
FIG. 7 is a block diagram showing a data flow of the computer system of the embodiment of the present invention.

FIG. 7 is a block diagram showing a data flow in the computer system 100 of the embodiment of the present invention. In FIG. 7, text and graphic images are converted into 4 bits tone value images. Continuous tone images are converted into bitmap images having the same value range as the 4 bits tone value images. Both the 4 bits tone value images and the bitmap images are managed as a single intermediate image. The intermediate image is converted into a binary bitmap image by one converting process. This means that the 4 bits tone value images corresponding to the graphic images and the bitmap images corresponding to the continuous tone images are converted at a time. Therefore, if the dither pattern is changed, it is possible to reform a binary bitmap image in a short time.

In addition, although the ordered dither method, the dot pattern method, the minimum average error method and the error diffusion method are used in the computer system 100 of the aforementioned embodiment, other halftoning techniques may be used.

Furthermore, although the page description language data of the graphic images are converted into the 4 bits tone value images in the aforementioned embodiment, the page description language data of text can be converted into the 4 bits tone value images.

Moreover, although the page description language data of the graphic images are converted into the 4 bits tone value images and the continuous tone images are converted into the bitmap images having 4 bits values, the page description language data of the graphic images may be converted into 8, 12, 16 or 32 bits tone value images and the continuous tone images may be converted into bitmap images having 8, 12, 16 or 32 bits values. However, the number of bit of each tone value of the tone value image corresponding to the graphic image has to be equal to the number of bit of each value of the bitmap image corresponding to the continuous tone image.

Moreover, in the aforementioned embodiment, the "converting processes and printing processes control program" is stored in the ROM 22 of the printer 120, and executed by the CPU 21 of the printer 120. However, the "converting processes and printing processes control program" may be executed by the CPU 11 of the computer 110. In this case, the "converting processes and printing processes control program" is stored in the ROM 12 of the computer 110.

Alternatively, the "converting processes and printing processes control program" may be recorded on a program storage device readable by the computer 110, such as an optical disc, a floppy or flexible disc and so on. In this case, the computer 100 can read the "converting processes and printing processes control program" from the program storage device by driving the disc driver device, and execute the "converting processes and printing processes control program" to thereby perform the aforementioned converting processes and the printing processes shown in FIG. 2.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 09267563 filed on September 30, 1997 including the specification, claims, drawings and summary is incorporated herein by reference in its entirety.

What is claimed is:

1. An image processing method of binarizing a plurality of multilevel tone value images including at least a first multi-level tone value image and a second multi-level tone value image, said image processing method comprising the processes of:
   (a) converting said first multi-level tone value image into a first bitmap image consisting of binary values;
   (b) replacing each binary value of said first bitmap image representing an on condition by a maximum value in a tone value range of said second multi-level tone value image, and replacing each binary value of said first bitmap image representing an off condition by a minimum value in said tone value range of said second multi-level tone value image;
   (c) managing said first bitmap image, whose each binary value has been replaced in said replacing process, and said second multilevel tone value image as a single intermediate image;
   (d) converting said intermediate image into a second bitmap image consisting of binary values, by using a threshold data matrix; and
   (e) outputting said second bitmap image.

2. An image processing method according to claim 1, wherein, in said managing process, said first bitmap image, whose each binary value has been replaced in said replacing process, and said second multi-level tone value image are managed as said single intermediate image on a signal memory space.

3. An image processing method according to claim 1, wherein said first multi-level tone value image is converted into said first bitmap image by using a dither method.

4. An image processing method according to claim 3, wherein said dither method is an error diffusion method.

5. An image processing method according to claim 1, wherein said intermediate image is converted into said second bitmap image by using a dither method, and said threshold data matrix is a dither pattern.

6. An image processing method according to claim 5, wherein said dither method is an ordered dither method.

7. An image processing method according to claim 1, wherein said first multi-level tone value image is a continuous tone image, and said second multi-level tone value image is a graphic image.

8. An image processing method according to claim 1 further comprising the process of changing said threshold data matrix.

9. An image processing system for binarizing a plurality of multilevel tone value images including at least a first multi-level tone value image and a second multi-level tone value image, said image processing system comprising:
   (a) a first converting device for converting said first multi-level tone value image into a first bitmap image consisting of binary values;
   (b) a replacing device for replacing each binary value of said first bitmap image representing an on condition by a maximum value in a tone value range of said second multi-level tone value image and replacing each binary value of said first bitmap image representing an off condition by a minimum value in said tone value range of said second multi-level tone value image;
   (c) a storage device for storing said first bitmap image, whose each binary value has been replaced by said maximum value or said minimum value in said tone value range of said second multi-level tone value image, and said second multi-level tone value image as a single intermediate image;
   (d) a second converting device for converting said intermediate image into a second bitmap image consisting of binary values, by using a threshold data matrix; and
   (e) an outputting device for outputting said second bitmap image.

10. An image processing system according to claim 9, wherein said first converting device converts said first multi-level tone value image into said first bitmap image by using a dither method.

11. An image processing system according to claim 10, wherein said dither method is an error diffusion method.

12. An image processing system according to claim 9, wherein said second converting device converts said intermediate image into said second bitmap image by using a dither method, and said threshold data matrix is a dither pattern.

13. An image processing system according to claim 12, wherein said dither method is an ordered dither method.

14. An image processing system according to claim 9, wherein said first multi-level tone value image is a continuous tone image, and said second multi-level tone value image is a graphic image.

15. An image processing system according to claim 9 further comprising a changing device for changing said threshold data matrix.

16. A program storage device readable by a computer, tangibly embodying a program of instructions executable by said computer to perform method processes for binarizing a plurality of multi-level tone value images including at least a first multi-level tone value image and a second multi-level tone value image, said method processes comprising:

(a) converting said first multi-level tone value image into a first bitmap image consisting of binary values;
(b) replacing each binary value of said first bitmap image representing an on condition by a maximum value in a tone value range of said second multi-level tone value image, and replacing each binary value of said first bitmap image representing an off condition by a minimum value in said tone value range of said second multi-level tone value image;
(c) managing said first bitmap image, whose each binary value has been replaced in said replacing process, and said second multilevel tone value image as a single intermediate image;
(d) converting said intermediate image into a second bitmap image consisting of binary values, by using a threshold data matrix; and
(e) outputting said second bitmap image.

17. A program storage device according to claim 16, wherein, in said managing process, said first bitmap image, whose each binary value has been replaced in said replacing process, and said second multi-level tone value image are managed as said single intermediate image on a signal memory space.

18. A program storage device according to claim 16, wherein said first multi-level tone value image is converted into said first bitmap image by using a dither method.

19. A program storage device according to claim 16, wherein said intermediate image is converted into said second bitmap image by using a dither method, and said threshold data matrix is a dither pattern.

20. A program storage device according to claim 16 further comprising the process of changing said threshold data matrix.

* * * * *